United States Patent [19]
Olofsson et al.

[11] 3,812,714
[45] May 28, 1974

[54] METHOD AND DEVICE FOR MEASURING THE FLOW RATE OF AN INTERMITTENT FLUID FLOW

[75] Inventors: Sven Olofsson, Jarfalla; Jan Tysk, Ekero, both of Sweden

[73] Assignee: LKB Medical AB, Bramma, Sweden

[22] Filed: May 17, 1973

[21] Appl. No.: 361,160

[30] Foreign Application Priority Data
May 23, 1972 Sweden.......................... 6710/72

[52] U.S. Cl................................ 73/194 R, 128/2.08
[51] Int. Cl............................ G01f 1/00, G01f 3/00
[58] Field of Search .. 73/194 R, 204, 194 E, 194 C; 128/2.08

[56] References Cited
UNITED STATES PATENTS
3,527,206  9/1970  Jones ................................ 128/2.08
3,604,263  9/1971  Awphan .............................. 73/204

*Primary Examiner*—James J. Gill
*Attorney, Agent, or Firm*—Eric H. Waters

[57] ABSTRACT

A method of measuring the instantaneous volumetric flow rate of an intermittent or pulsating fluid flow comprises the steps of employing a flow meter unsuitable for measuring flow rates below a given threshold value, adding to the intermittent fluid flow to be measured a second fluid flow having a known flow rate exceeding the threshold value of the flow meter, supplying the resulting combined fluid flow to the flow meter and subtracting from the measuring output of the flow meter a value corresponding to the known flow rate of said second fluid flow, whereby a measuring output is produced representing the instantaneous volumetric flow rate of the unknown intermittent fluid flow.

2 Claims, 1 Drawing Figure

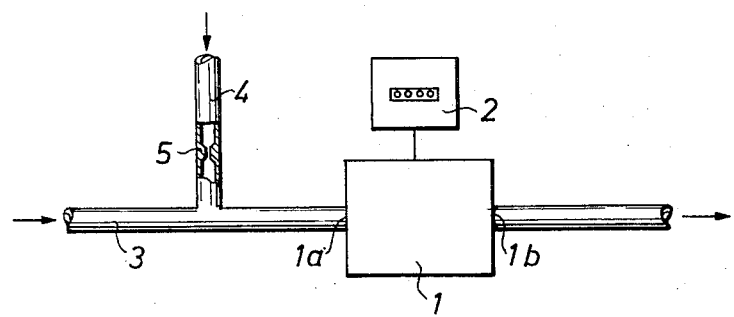

METHOD AND DEVICE FOR MEASURING THE FLOW RATE OF AN INTERMITTENT FLUID FLOW

The present invention is related to a method and a device for measuring the volumetric flow rate of a pulsating or intermittent fluid flow.

A large number of various flow meters of different designs and with different modes of operation are known in the art for measuring the volumetric flow rate of a fluid flow. However, many of these prior art flow meters are of a comparatively complicated mechanical design including moving parts, wherefore these flow meters are unsuitable for applications, as for instance in the field of medical technic, where the flow meters must be easy to clean and sterilize. In certain applications it is additionally required that the flow meters are insensitive to the properties of the flowing fluid. This is for instance the case for flow meters which are to be used in lung ventilators and similar apparatuses, in which it is desired that one and the same flow meter can be used for measuring the flow rate of different kinds of gases or gas mixtures with a varying composition. Two types of flow meters which seem to satisfy the condition of a simple mechanical design without any moving parts so as to be easily cleaned and/or sterilized, as well as the condition of being insensitive to the properties and composition of the flowing fluid, consist on the one hand of the so called fluidistor flow meters and on the other hand on flow meters of the type utilizing the Karman vortex street.

A fluidistor flow meter consists in principle of a conventional fluidistor having a fluid inlet and two fluid outlets and a control chamber between the inlet and the two outlets, which control chamber is provided with two control ports, between which a feedback loop is provided in such a manner that a fluid flow supplied to the inlet of the fluidistor will be automatically and periodically switched between the two outlets of the fluidistor. The frequency of the periodic switching of the fluid flow between the two outlets of the fluidistor is directly proportional to the volumetric flow rate of the fluid flow; that is between each switching of the fluid flow from one outlet to the other outlet the inlet of the fluidistor must be supplied with a given fluid volume determined by the dimensions of the particular fluidistor. The switching frequency can be monitored by means of a suitable sensor arranged in the one or both outlets of the fluidistor, for instance by means of a pressure transducer, a thermistor sensor or a similar device mounted in the one outlet of the fluidistor.

A flow meter utilizing the Karman vortex street consists in principle of a stationary flow disturbing body, for instance in the shape of a cylinder, a sphere, a wedge or a similar body, mounted in the path of the fluid flow. Downstream of such a flow disturbing body a series of vortexes, a so called Karman vortex street, is created in the fluid flow. The vortexes are produced periodically with a frequency which is directly proportional to the flow velocity of the fluid flow and thus also to the volumetric flow rate of the fluid flow. This frequency can be monitored by means of suitable electrical sensors or transducers, as for instance a microphone, responsive to the pressure variations produced by the vortexes.

It has been found, however, that fluidistor flow meters as well as flow meters utilizing the Karman vortex street cannot be used for measuring the volumetric flow rate of a pulsating or intermittent fluidum flow. This is, however, a measuring problem which must be solved in many connections, as for instance when measuring the expiratory gas volume in a lung ventilator, in which case the gas flow, for which the volumetric flow rate is to be measured, consists of flow pulses corresponding to the expirations of the patient separated by intervals without any gas flow at all, corresponding to the inhalations of the patient. Also in many other applications such pulsating or intermittent fluid flows may of course exist, for which the volumetric flow rate should be measured.

The reason why a fluidistor flow meter cannot without difficulties be used for measuring the volumetric flow rate of a pulsating or intermittent fluid flow is connected with the previously described mode of operation of such a fluidistor flow meter, namely that each switching of the fluid flow between the two outlets of the fluidistor does not take place until a predetermined fluid volume has been supplied to the inlet of the fluidistor after the last preceding switching of the fluid flow. Further, a fluidistor has no "memory." Thus, if at the end of a flow pulse the fluid volume supplied to the fluidistor by the said flow pulse after the last switching of the flow has not reached a value sufficient for causing another switching of the fluid flow, this fluid volume will not be measured at all, as at the beginning of the next flow pulse no switching of the fluidistor will take place until the full fluid volume necessary for such a switching has been supplied to the fluidistor by this new flow pulse. In order to measure the volumetric flow rate of a pulsating or intermittent fluid flow by means of a fluidistor flow meter and with a reasonable accuracy it is consequently necessary that the fluidistor has such dimensions that the fluid volume required for each switching of the fluid flow is very small as compared to the total fluid volume in each flow pulse. However, a reduction of the fluid volume required for each switching of the fluidistor necessitates such changes in the dimensions of the fluidistor that the flow resistance and thus also the pressure drop in the fluidistor increases, something that is not desired in many applications, as for instance when measuring the expiratory gas volume in a lung ventilator.

The reason why a flow meter utilizing the Karman vortex street cannot be properly used for measuring the volumetric flow rate of a pulsating or intermittent fluid flow is due to the fact that with decreasing flow velocity of the fluid flow not only the frequency of the vortexes produced but also their amplitude is reduced. This means that not only the frequency of the output signal from the flow meter but also the amplitude of the output signal decreases, when the flow velocity of the fluid flow decreases. For small flow velocities the amplitude of the output signal will become so small that the output signal becomes lost in the signal noise and in other disturbances which cannot be avoided from the output of the sensor used for monitoring the frequency of the vortexes. Due to this noise signal, which for small flow velocities of the fluid flow has a larger amplitude than the actual measuring signal, the measuring result will obviously be inaccurate and indicate a too large volumetric flow rate during the time intervals when the flow velocity is low and in particular during the zero flow intervals in the pulsating or intermittent fluid flow.

Of course there are also other types of flow meters in addition to the two types discussed in the foregoing, which cannot be used for an accurate measuring of the volumetric flow rate of a pulsating or intermittent fluid flow, due to the fact that they do not measure sufficiently accurately at flow velocities close to zero. This is for instance the case for flow meters which do not produce any output signal at all, until the flow velocity of the fluid flow exceeds a given lower limit value.

The object of the present invention is therefore to provide a method and a device, which makes it possible to measure the volumetric flow rate of a pulsating or intermittent fluid flow employing a flow meter of the kind discussed in the foregoing, which as such is unsuitable for an accurate measuring of the volumetric flow rate of a pulsating or intermittent fluid flow.

The method according to the invention is characterized in that it comprises the steps of adding to the pulsating or intermittent fluid flow to be measured a second fluid flow of a known and preferably constant magnitude, supplying the resulting combined fluid flow to a flow meter, and subtracting from the measurement output of said flow meter representing the volumetric flow rate of the combined fluid flow an amount corresponding to the volumetric flow rate of said second, known fluid flow.

By the method according to the invention it is achieved that the fluid flow through the flow meter is continuous, that is also during the periods when the unknown pulsating fluid flow has a zero flow velocity. When employing for instance a fluidistor flow meter it is in this way achieved that no volumes of the fluid flow can become "lost" in the measurement, as the fluid flow through the flow meter will not display any complete interruptions. When using a flow meter based on the Karman vortex street it is in a similar manner achieved that the flow meter will always produce an output signal having an amplitude sufficient for an accurate measuring.

When using a flow meter which is independent of and insensitive to the properties of the flowing fluid, as for instance a fluidistor flow meter or a flow meter based on the Karman vortex street, the known fluid flow which is added to the unknown pulsating fluid flow to be measured does not have to consist of the same fluid as the unknown pulsating fluid flow. Thus, for instance, in connection with a lung ventilator the known fluid flow may consist of ordinary air, even if the unknown pulsating fluid flow to be measured consists of another gas or gas mixture.

It is obvious from the foregoing that the method according to the invention is particularly preferable and applicable in such cases where the unknown pulsating fluid flow to be measured shall not be used for any particular purpose after the measurement, wherefore it is not necessary to separate the added known fluid flow from the pulsating fluid flow after the flow meter.

In the following the invention will be further described with reference to the accompanying drawing, in which by way of example and schematically the method according to the invention and a device for employing this method is illustrated.

The drawing shows schematically a flow meter 1 of a suitable type discussed in the foregoing, which is provided with a flow inlet 1a and flow outlet 1b and which produces an output signal which represents the volumetric flow rate of the fluid flow through the flow meter. This output signal is supplied to a suitable, recording or indicating display unit 2. The unknown pulsating or intermittent fluid flow to be measured is supplied to the inlet 1a of the flow meter 1 through a conduit 3. The flow inlet 1a of the flow meter is additionally supplied with a second fluid flow through a conduit 4. This conduit 4 includes a restriction 5 and the fluid pressure in the conduit 4 upstream of this restriction 5 is maintained at such a high level that the fluid flow through the restriction 5 has a constant volumetric flow rate substantially independent of the pressure downstream of the restriction 5. Consequently, the combined fluid flow supplied to the inlet 1a of the flow meter consists of the sum of the unknown pulsating or intermittent fluid flow in the conduit 3, the volumetric flow rate of which is to be measured, and the constant, known fluid flow from the conduit 4. The output signal of the flow meter 1 represents consequently the volumetric flow rate of this combined fluid flow. The display unit 2 is of such a design that it subtracts automatically from the output of the flow meter 1 an amount or quantity corresponding to the volumetric flow rate of the constant known fluid flow supplied through the conduit 4. The magnitude of this constant volumetric flow rate of the fluid flow supplied through the conduit 4 and the restriction 5 can easily be determined for calibration of the measuring device in that the supply conduit 3 is shut off completely so that the flow meter 1 measures only the volumetric flow rate of the fluid flow supplied through the conduit 4.

It is appreciated that the practical design and construction in detail of a flow measuring device according to the invention will depend on the type of flow meter used, the type of fluid constituting the pulsating fluid flow, the source of the pulsating fluid flow and possibly also the intended use of this fluid flow after the measuring and other similar factors.

What we claim is:

1. A method of measuring the instantaneous volumetric flow rate of an intermittent fluid flow employing a flow meter unsuitable for measuring flow rates below a given threshold value, comprising the steps of adding to said intermittent fluid flow to be measured a second fluid flow having a known flow rate exceeding said threshold value, supplying the resulting combined fluid flow to said flow meter, and subtracting from the measuring output of said flow meter a value corresponding to the flow rate of said second fluid flow.

2. A device for measuring the instantaneous volumetric flow rate of an intermittent fluid flow, comprising a flow meter unsuitable for measuring flow rates below a given threshold value, means for producing a second fluid flow having a known flow rate exceeding said threshold value and adding said second fluid flow to said intermittent fluid flow to be measured and for supplying the resulting combined fluid flow to said flow meter, and means for reducing the measuring output of said flow meter by an amount corresponding to the known flow rate of said second fluid flow.

* * * * *